United States Patent [19]

Bardo

[11] Patent Number: 5,028,357
[45] Date of Patent: Jul. 2, 1991

[54] LIGHTWEIGHT COOLING TOWER WITH CRUCIFORM COLUMNS

[75] Inventor: Charles J. Bardo, Fort Worth, Tex.
[73] Assignee: Ceramic Cooling Tower Company, Fort Worth, Tex.
[21] Appl. No.: 392,448
[22] Filed: Aug. 14, 1989
[51] Int. Cl.⁵ .............................................. B01F 3/04
[52] U.S. Cl. ........................... 261/111; 261/DIG. 11; 52/239; 52/282; 52/738
[58] Field of Search ........................ 261/111, DIG. 11; 52/239, 648, 282, 738

[56] References Cited

U.S. PATENT DOCUMENTS

| | | | |
|---|---|---|---|
| 1,741,219 | 12/1929 | Bemis | 52/282 |
| 2,049,692 | 8/1936 | Dawson | 52/282 |
| 2,196,399 | 4/1940 | Rubel | 52/282 |
| 2,232,510 | 2/1941 | Backham | 52/648 |
| 2,388,297 | 11/1945 | Slaughter | 52/282 |
| 2,529,648 | 11/1950 | Borton | 52/282 |
| 2,723,107 | 11/1955 | Parker | 52/282 |
| 3,078,080 | 2/1963 | Slough | 52/648 |
| 3,292,323 | 12/1966 | Hagan | 52/282 |
| 3,638,380 | 2/1972 | Perri | 52/648 |
| 3,866,373 | 2/1975 | Hudock | 52/738 |
| 4,069,638 | 1/1978 | Hasselquist et al. | 52/738 |
| 4,109,429 | 8/1978 | Whisson | 52/239 |
| 4,125,973 | 11/1978 | Lendrihas | 52/648 |
| 4,329,824 | 5/1982 | Lowe | 52/738 |
| 4,382,046 | 5/1983 | Frohwerk | 261/94 |
| 4,422,983 | 12/1983 | Bardo et al. | 261/DIG. 11 |
| 4,483,118 | 11/1984 | Betschart | 52/648 |
| 4,543,218 | 9/1985 | Bardo et al. | 261/24 |
| 4,587,787 | 5/1986 | King | 52/648 |
| 4,602,470 | 7/1986 | Stuart et al. | 52/648 |
| 4,612,744 | 9/1986 | Shamash | 52/239 |
| 4,637,903 | 1/1987 | Bardo et al. | 261/24 |
| 4,719,731 | 1/1988 | Ravotti | 52/239 |
| 4,803,819 | 2/1989 | Kelsey | 52/738 |

Primary Examiner—Tim Miles

[57] ABSTRACT

A structural column has a generally cruciform cross section. The column includes a generally rectangular core section formed by four orthogonally related walls and four flange portions. Each flange portion is provided by a pair of spaced-apart parallel flanges which are extensions of a pair of parallel walls. The column is particularly suited for a cooling tower which includes at least four vertically extending columns. A horizontal beam extends between each pair of adjacent columns, and the ends of each beam are inserted between the parallel flanges of the columns. A side panel is supported by each beam, and a cover is supported by the side panels and the columns.

21 Claims, 6 Drawing Sheets

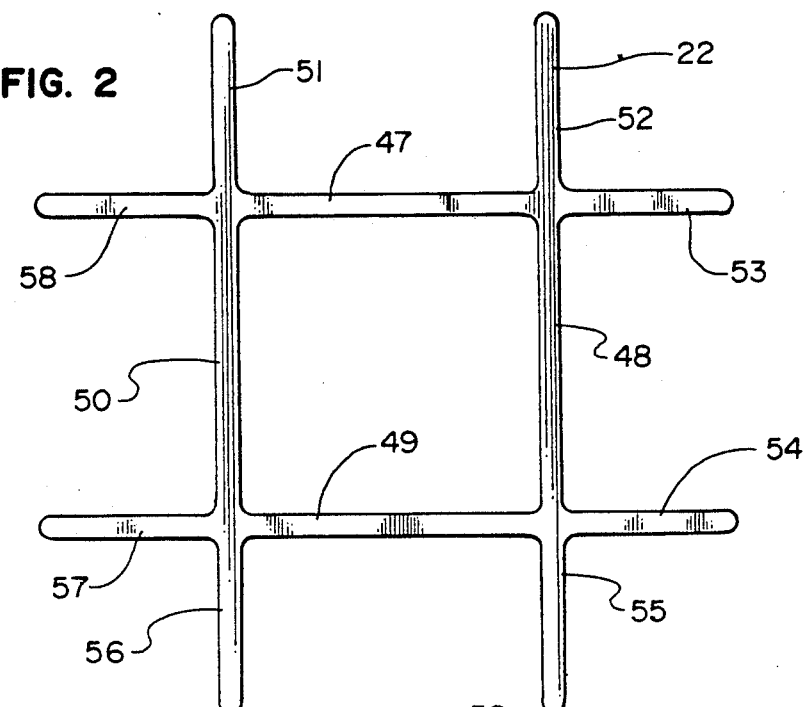
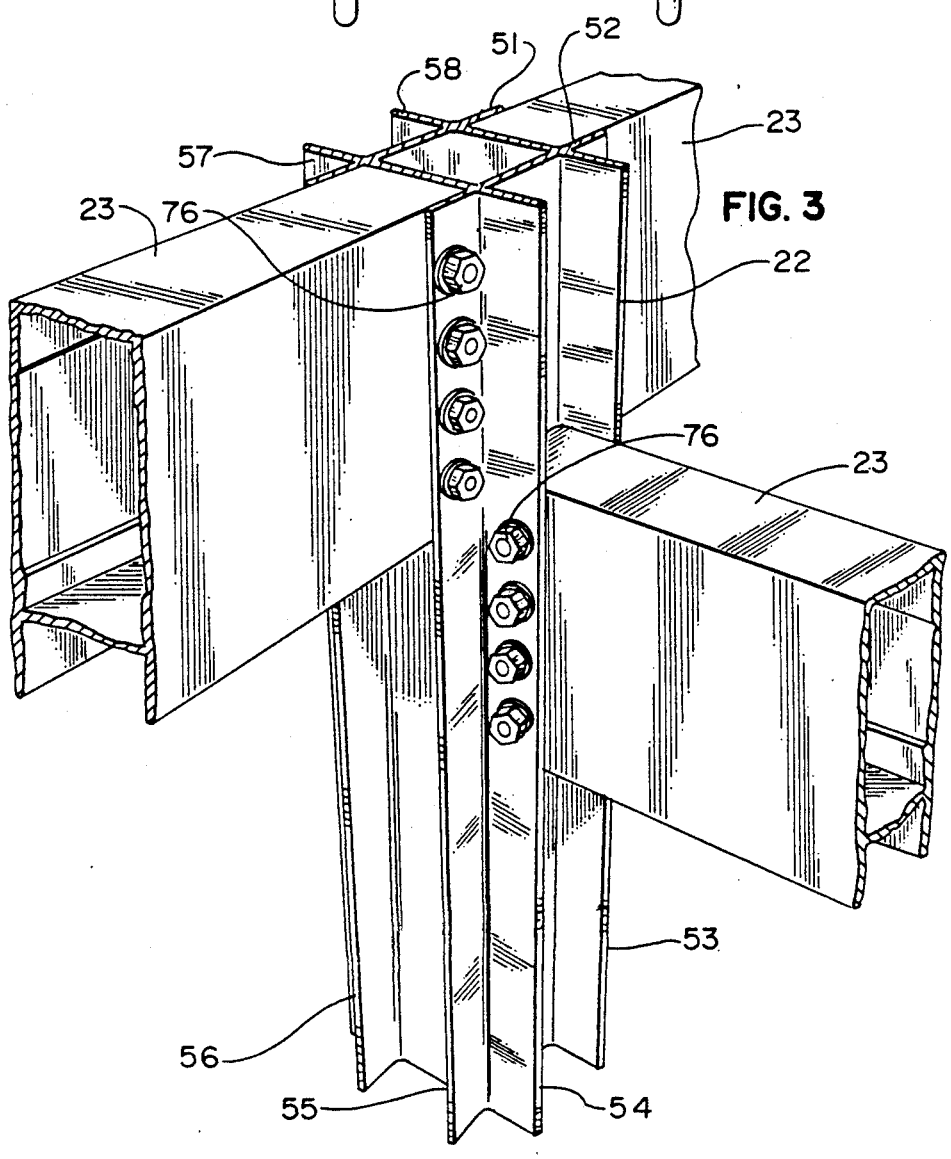

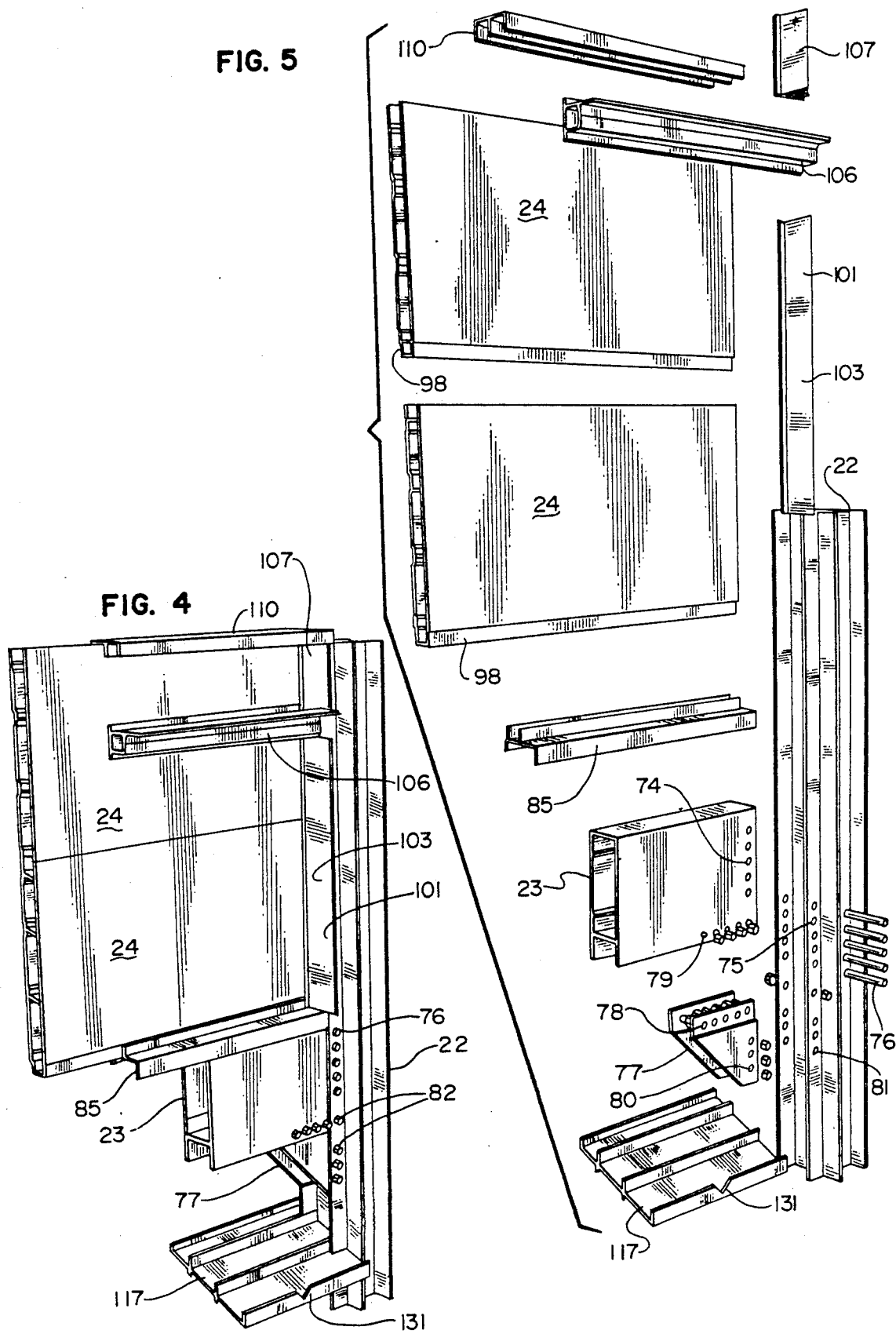

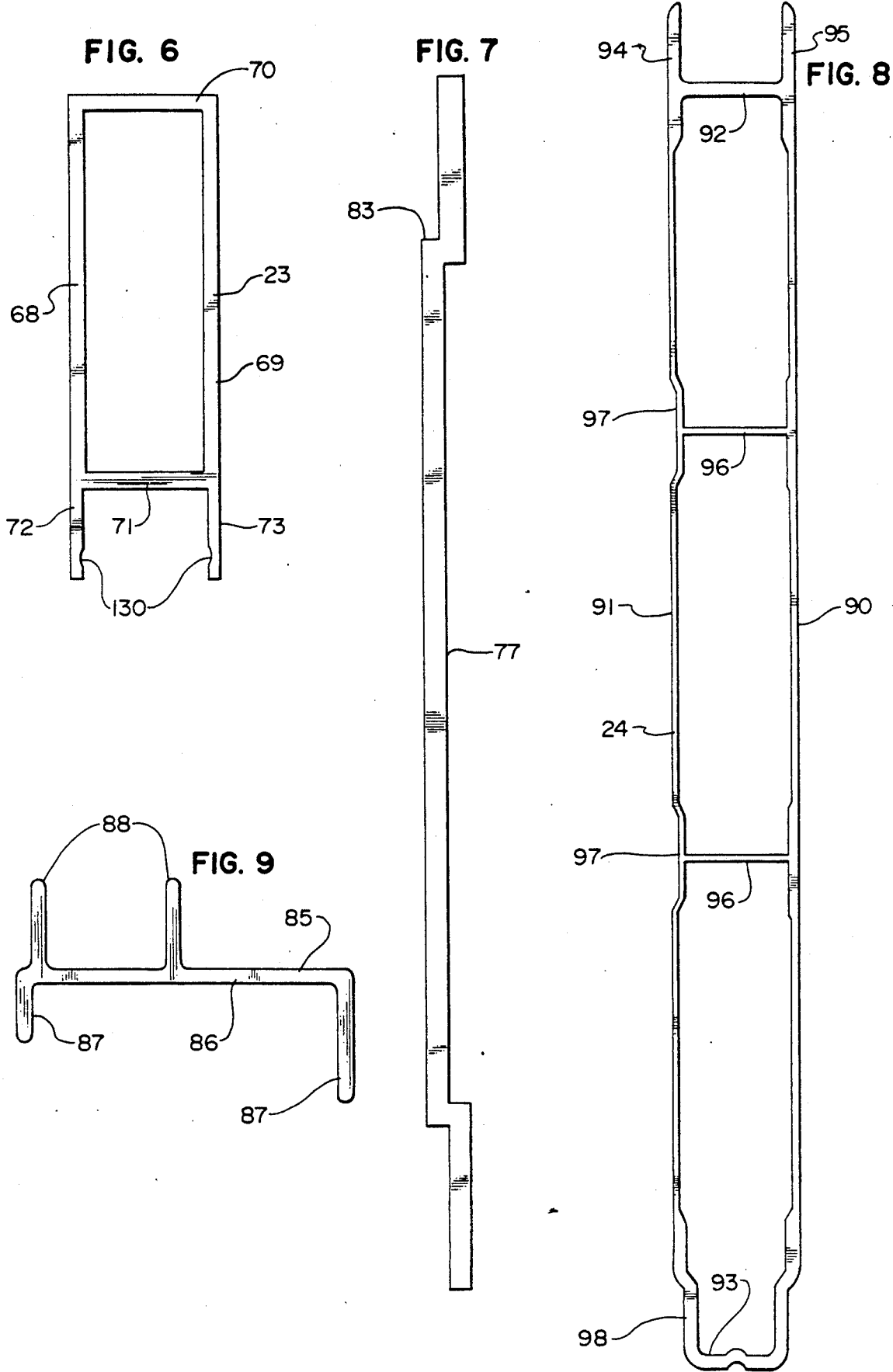

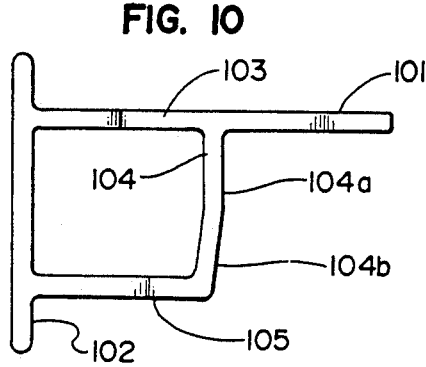
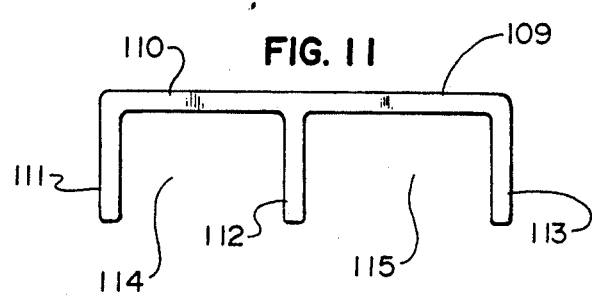
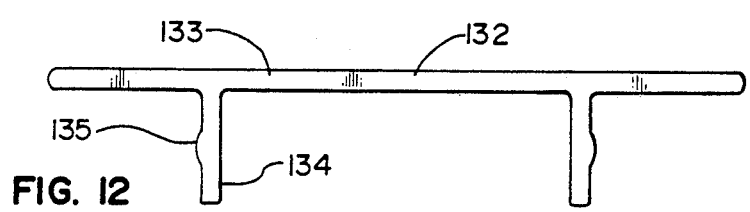
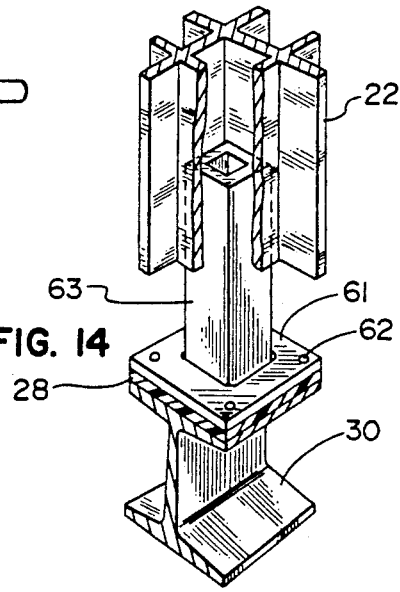
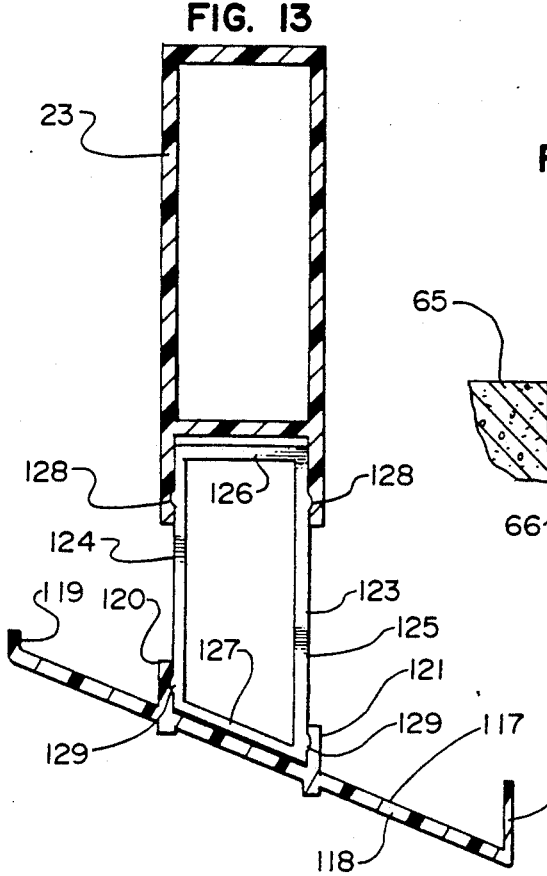
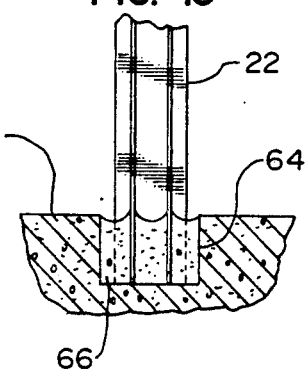
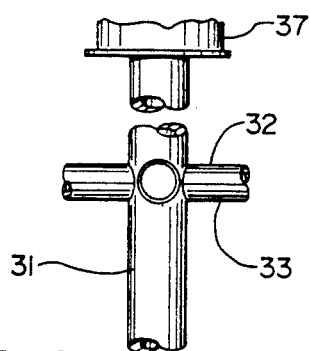
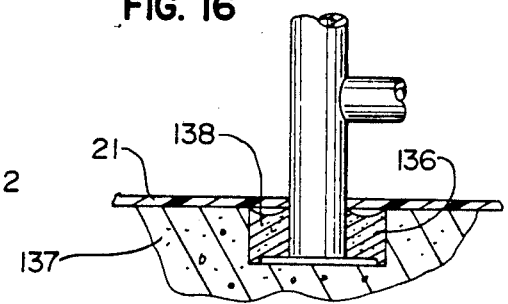

LIGHTWEIGHT COOLING TOWER WITH CRUCIFORM COLUMNS

BACKGROUND

This invention relates to a structural column having a cruciform cross section and to a cooling tower which is supported by such columns.

Cooling towers are used to cool liquid by contact with air. The liquid is allowed to flow downwardly through the tower, and a counter current flow of air, is drawn through the falling liquid by various means. A common application for liquid cooling towers is for cooling water (dissipating waste heat) used in electrical generating and process plants and industrial and institutional air conditioning systems.

Most cooling towers include a tower structure which encloses a fill material. The fill material has spaces through which the liquid flows downwardly and the air flows upwardly to provide heat and mass transfer between the liquid and the air. The tower structure may be formed from concrete, metal, or other material.

Metal parts of cooling towers can be corroded by the local atmosphere and/or the liquid which is being cooled. Concrete is very durable, but concrete towers are expensive and heavy. Many cooling towers are located on roofs of buildings, and the weight of a concrete cooling tower can cause building design problems. Co-owned U.S. Pat. No. 4,382,046 refers to a cooling tower with concrete walls which are supported above a concrete water basin by concrete supports.

Plastic parts are resistant to corrosion, but plastic parts ordinarily would not provide enough strength to support the fill material and the weight of the tower itself. One well-known type of fill material which is used by Ceramic Cooling Towers of Forth Worth, Tex. consists of stacked layers of open-celled clay tiles. This fill material can weight 60,000 to 70,000 pounds for a conventional size air conditioning cooling tower. Structural parts of a cooling tower must not only support the weight of the fill material but must also resist wind forces and should be designed to withstand earthquake loads.

Co-owned U.S. Pat. No. 4,422,983 describes a cooling tower formed from fiberglass reinforced polyester resin panels and beams. All of the structural parts of the tower are fiberglass reinforced polyester resin except the cast iron lintels which are used to support the fill material and stainless steel bolts which connect the fiberglass reinforced polyester resin parts.

Co-owned U.S. Pat. No. 4,543,218 describes a cooling tower in which the weight of the tower and the fill material is supported by precast concrete support legs and the basin is concrete. A liquid supply pipe extends vertically upwardly through the fill material and supports the weight of the fan.

Co-owned U.S. Pat. No. 4,637,903 describes a lightweight cooling tower in which all of the structural components are formed from fiberglass reinforced polyester resin, and the fill material is supported directly by the basin.

The cooling towers described in the foregoing patents had many advantages over prior cooling towers. However, many customers of cooling towers continue to purchase wood towers. The advantage of a wood tower is that the wood is inexpensive and is easy to fabricate and ship. However, wood towers are difficult to assemble and are prone to rotting. The average life of a wood tower is only about 7 to 10 years, and maintenance costs are high.

SUMMARY OF THE INVENTION

The invention provides a unique structural column which is particularly suited for use in cooling towers but which can be used in a variety of structures. The column is formed by pultruding fiberglass reinforced polyester resin into a generally cruciform shape to provide the column with a generally rectangular core section with four perpendicular walls and four flange portions. Each flange portion includes a pair of flanges which are extensions of two parallel walls. Four vertically extending columns provide four corners of a cooling tower, and a beam extends between each pair of adjacent columns. Each end of each beam is inserted between parallel flanges of a column and secured thereto. A side panel is supported by each beam, and each side edge of each side panel is inserted between parallel flanges of a column. The beams and side panels are also formed by pultruding fiberglass reinforced polyester resin. A cover is supported by the side panels and the columns. A basin is positioned at the bottom of the columns, and a water supply pipe extends vertically upwardly from the basin through a porous heat/mass exchange medium. The cruciform column is stable in any direction and provides secure support for the weight of the beams, side panels, and cover as well as seismic and wind loads. The cost of the pultruded components are about one-half of the cost of fiberglass components which are formed by the traditional procedure of laying up fiberglass in a gel-coated mold and spraying with resin. The unique column permits the beams and the side panels to be interfitted with the columns in a way which reduces the size of the beams and panels, thereby facilitating shipping, and the interfitting relationship facilitates erection of the tower. The cooling tower is fireproof and water resistant but is also lightweight, economical, and easy to ship and erect.

DESCRIPTION OF THE DRAWING

The invention will be explained in conjunction with an illustraive embodiment shown in the accompanying drawing, in which

FIG. 2 is an end view of one of the columns;

FIG. 3 is a fragmentary perspective view showing the horizontal beams connected to one of the corner columns;

FIG. 4 is a fragmentary perspective view of the interior of the cooling tower showing the relationship between the column, the horizontal beam, and the side panels;

FIG. 5 is an exploded perspective view of the parts of FIG. 4;

FIG. 6 is an end view of one of the beams;

FIG. 7 is an end view of one of the gusset plates;

FIG. 8 is an end view of one of the side panels;

FIG. 9 is an end view of the base channel for the side panel;

FIG. 10 is an end view of the panel filler;

FIG. 11 is an end view of the top channel for the side panel;

FIG. 12 is an end view of the beam cap;

FIG. 13 is a sectional view showing a drip collector connected to a beam;

FIG. 14 is a fragmentary perspective view showing a column being inserted over a positioning pin and a support beam;

FIG. 15 is a fragmentary view, partially broken away, showing a column embedded in a concrete pad;

FIG. 16 is a fragmentary view, partially broken away, of the vertical liquid supply pipe.

DESCRIPTION OF SPECIFIC EMBODIMENT

Figure 1:
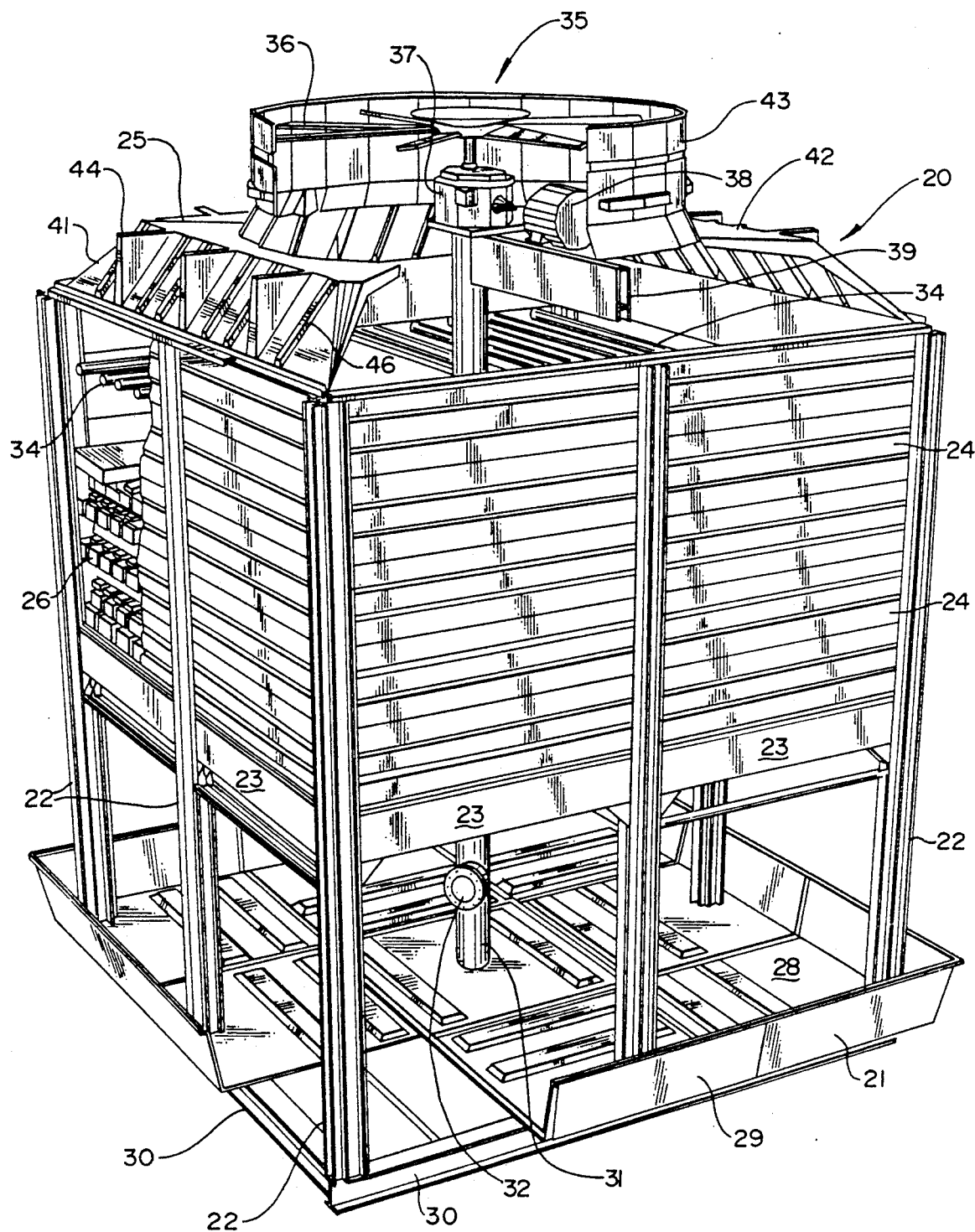
FIG. 1 is a perspective view, partially broken away, of a cooling tower formed in accordance with the invention.

The invention will be described with reference to an air conditioning cooling tower 20 illustrated in FIG. 1. It will be understood, however, that the invention can be used with other types of structures. The cooling tower 20 is a mechanical draft type of cooling tower which is used for cooling water for an air conditioning system. The cooling tower includes a liquid basin 21 at the bottom of the tower, eight vertically extending columns 22, eight horizontal beams 23 which extend between adjacent columns, a plurality of side panels 24 which are supported by the beams, and a cover 25 which is supported by the side panels and the columns.

A plurality of support lintels extend between and are supported by a pair of the parallel beams 23, and the lintels support the fill material 26 of the tower. The lintels can be cast iron as described in U.S. Pat. Nos. 4,543,218, 4,422,983, and 4,382,046, or the lintels can be formed of other material such as fiberglass reinforced resin.

The particular fill material 26 which is illustrated is provided by the rectangular open-celled extruded clay tiles which are also described in U.S. Pat. Nos. 4,382,046 and 4,422,983. The tiles are supported by the lintels and are stacked in a plurality of layers to provide a porous heat and mass transfer exchange means for the tower. Other types of fill material could be used.

The liquid basin 21 includes a bottom wall 28 and an upwardly extending side wall 29. The basin is advantageously made from fiberglass reinforced polyester resin as described in U.S. Pat. No. 4,422,983. The basis is supported by at least four steel I beams 30 which extend around the perimeter of the basin and beneath the columns 22. Additional I beams can support the interior of the bottom wall of the basin as needed. Alternatively, the basin and the columns can be supported by a concrete pad or other support rather than the I beams.

A water supply pipe 31 extends vertically upwardly from the basin through the fill material 26. An inlet pipe 32 is connected to the supply pipe 31, and the inlet pipe is connected to the hot water outlet of the air conditioning system by conventional piping (not shown). A water distribution system is connected to the upper end of the water pipe 31 for spraying water onto the top of the fill material. The water distribution system can be of the type which is described in U.S. Pat. No. 4,543,218 and includes four headers 33 (FIG. 16) and a plurality of lateral pipes 34 which are equipped with a plurality of spray nozzles.

A fan assembly 35 is supported on top of the water pipe 32. The fan assembly includes a fan 36, a gear reducer 37, and a motor 38. The gear reducer 37 is mounted on top of the water pipe 32, and the motor 38 is mounted on a beam 39. One end of the beam is attached to the pipe 31, and the other end of the beam is supported by one of the columns 22. The fan draws air from outside of the cooling tower upwardly through the fill material. A conventional drift eliminator (not shown) may be supported on top of the lateral pipes 34.

The cover 25 includes four side walls 41, a horizontal top wall 42, and a generally cylindrical fan shroud 43. Each of the side walls 41 includes three generally triangular box sections 44 and a plurality of ribs 45 for reinforcing the side walls. The beam 39 which supports the fan motor fits into one of the box sections. The cover can be molded from fiberglass reinforced polyester resin. The fan shroud can be formed from two semi-cylindrical halves which are secured together and to the top wall 42.

Referring now to FIG. 2, each of the columns 22 is generally cruciformed in transverse cross section and has a tic-tac-toe configuration. The column includes a rectangular core section or central box section and four flange portions. The core is formed by four perpendicular or orthogonal walls 47-50, and each flange portion is formed by a pair of parallel, spaced-apart flanges 51-58. Each pair of parallel flanges is an extension of two parallel walls.

The columns are preferably formed by pultruding fiberglass reinforced polyester resin. The pultrusion process is well known for forming fiberglass reinforced polyester resin structural components such as I beams, channels, angles, etc. However, columns having the cross section illustrated in FIG. 2 have not previously been pultruded. Pultrusion is a continuous molding process which utilizes glass or fibrous reinforcement in a polyester or other thermosetting resin. The reinforcing material is drawn through a resin bath, and the resin-impregnated reinforcing material is pulled through a heated steel die. The reinforcement/resin laminate solidifies in the shape of the cavity of the die as it is pulled by the pultrusion machine.

Each of the columns 22 extends vertically upwardly from the water basin 21. The bottom of each column is supported by one of the steel I beams 30, and is preferably connected to the I beam to secure the column against transverse movement. FIG. 14 illustrates one method of securing the column. A metal base plate 61 is supported by the bottom wall 28 and the I beam and is connected to the I beam by bolts or rivets 62. A rectangular pin 63 is welded to the plate 61 and is sized to be received relatively snugly within the core section of the column. The column is inserted over the pin and is supported by the plate 61.

FIG. 15 illustrates an alternate method of securing the column when the basin is supported by a concrete pad or when the basin itself is concrete. A hole or recess 64 is made in the concrete pad 65. The column is inserted into the hole, and the hole is filled with grout 66 or other fill material which will set.

Referring to FIGS. 4-6, each of the beams 23 has a generally rectangular transverse cross section which is provided by a pair of side walls 68 and 69 and top and bottom walls 70 and 71. The side walls extend beyond the bottom wall and form flanges 72 and 73. The width of the beam is slightly less than the spacing between the parallel flanges on the column so that the end of the beam can be inserted between two parallel flanges. Each end of the beam is provided with openings 74 which can be aligned with openings 75 in the flanges of the column. The beams are secured by pins or bolts 76 which are inserted through the aligned openings. The bolts are preferably formed from stainless steel to minimize corrosion.

In the embodiment illustrated, each beam end is reinforced by a pair of generally triangular gusset plates 77 (see also FIG. 7). Each gusset plate is provided with top openings 78 which are aligned with openings 79 in the beam and side openings 80 which are aligned with openings 81 in the flanges of the column. The gusset plates are secured by bolts or pins 82. Referring to FIG. 7, the gusset plate includes a shoulder 83 which engages the bottom edge of the beam.

In the particular embodiment illustrated in the drawing, the cooling tower includes eight columns 22. Four of the columns are located at the corners of the tower, and four columns are positioned intermediate the corner columns. A beam 23 extends between each corner column and the intermediate column. Since each column has four sets of parallel flanges, beams can extend perpendicularly from each column as illustrated in FIG. 3. In FIG. 3 perpendicular beams are offset vertically to facilitate inserting and securing the bolts 76. However, depending upon the depth of the flanges on the column, the beams could be level.

Each of the side panels 24 is supported by a base channel 85 which is supported by a beam 23. Referring to FIG. 9, the base channel 85 includes a central wall 86, a pair of parallel downwardly extending flanges 87, and a pair of a parallel upwardly extending flanges 88. The spacing between the downwardly extending flanges is slightly greater than the width of the beam so that the channel fits snugly over the top of the beam.

Referring to FIG. 8, each of the side panels 24 includes generally parallel inside and outside walls 90 and 91 and top and bottom walls 92 and 93. The inside and outside walls extend upwardly beyond the top wall to form a pair of parallel flanges 94 and 95. Reinforcing ribs 96 extend transversely between the inside and outside walls, and the outside wall includes a reinforcing groove or embossment 97 at each rib. The inside and outside walls neck inwardly at the bottom of the panel to provide an insert portion 98 of reduced width.

The width of the insert portion 98 of the side panel is such that it can be inserted snugly into the channel formed by the flanges 88 on the base channel 85. The ends of the panels are inserted between the parallel flanges of the column.

In the embodiment illustrated in the drawings, a pair of side panels 24 are stacked one on top of the other between each pair of adjacent columns 22. The insert portion 98 of the upper panel is sized to fit snugly between the flanges 94 and 95 on the top of the lower panel. Since the side panels can be stacked on top of each other to form a tower of the desired height, each individual panel is relatively small and can be shipped easily and economically.

Figure 17:
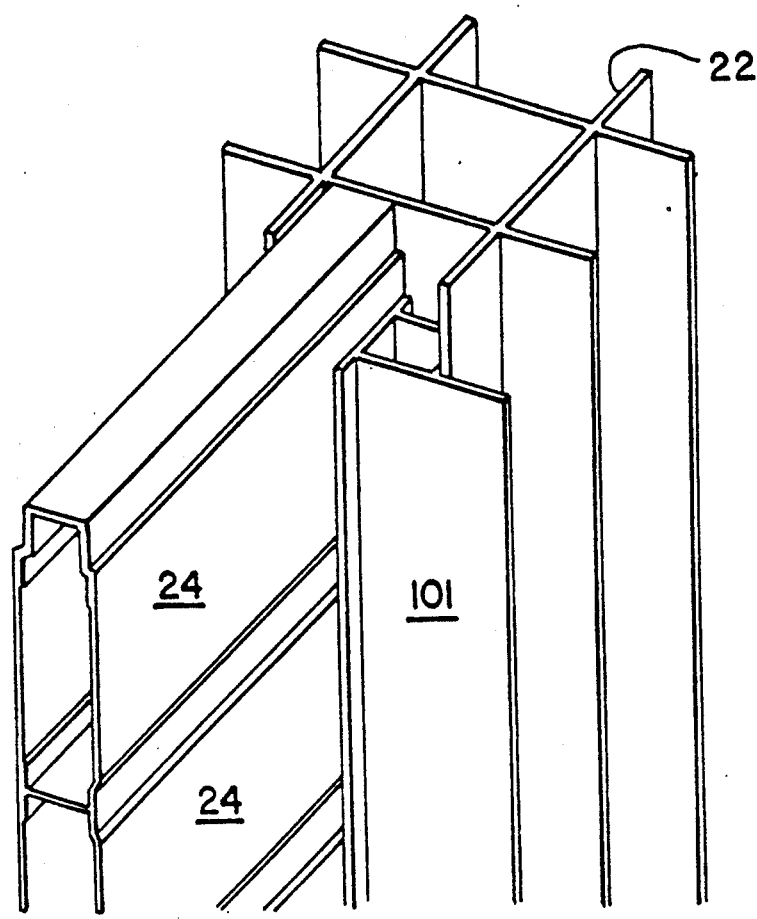
FIG. 17 is a fragmentary perspective view of a filler member disposed between a column of the cooling tower and a side panel.
Figure 18:
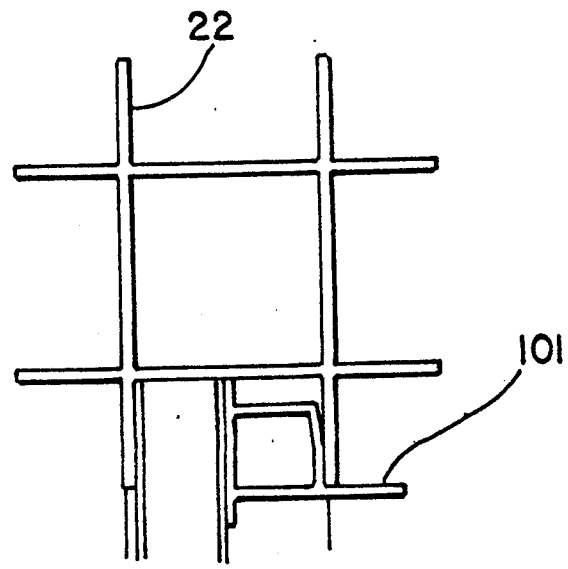
FIG. 18 is a top plan view of the column, filler member, and side panel assembly shown in FIG. 17.

The width of the side panel is less than the spacing between the parallel flanges of the column 22. Accordingly, a panel filler member 101 is inserted into the space between the inside wall of the panel and one of the flanges. Referring to FIG. 10, 17 and 18, the filler member includes four walls 102-105. The wall 104 includes a first portion 104a which extends perpendicularly from the wall 103 and a second portion 104b which angles toward the wall 102. The distance between the outside surface of the wall 102 and the outside surface of the wall 104a is substantially the same as the space between the side panel 24 and the flange of the column 22 so that when the filler member is inserted into the space by positioning the wall 102 against the side panel and pushing the wall 105 into the space, the side panel will be wedged in place. The angled wall 104b facilitates insertion of the filler member. Referring to FIGS. 4 and 5, the long wall 103 of the filler member is positioned outside of the flange of the column and extends perpendicularly to the side panel 24.

The filler member 101 terminates below the top of the second side panel 24, and a second filler member 106 extends horizontally across the side panel. A third panel filler member 107 extends vertically upwardly from the filler member 106. The horizontal filler member 106 is attached to the inside wall of the side panel by pop rivets, adhesive, etc. and provides support for the water distribution laterals 34.

A top channel 109 is inserted over the top edge of the side panel 24. Referring to FIG. 11, the top channel includes a horizontal top wall 110 and three vertical flanges 111-113 which form two channels 114 and 115. The side panel 24 is snugly received in the channel 114.

An inclined drip collector trough 117 hangs below each beam 23 to catch water which drips downwardly along the side panels and the beams. The drip collector directs the water inwardly into the water basin 21. Referring to FIG. 13, the drip collector includes an inclined bottom wall 118 and four upwardly extending flanges 119-122. The drip collector is suspended from the beam 23 by a connector 123. The connector 123 includes a pair of vertical walls 124 and 125, a top wall 126, and an angled bottom wall 127. Ribs 128 extend horizontally along the upper portion of the vertical walls, and ribs 129 extend horizontally along the lower portions of the vertical walls. The ribs 128 are snap-fitted into grooves 130 (see also FIG. 6) in the flanges 72 and 73 of the beam 23, and the ribs 129 are snap-fitted into grooves in the flanges 120 and 121 of the drip collector. Two short connectors are used to support each drip collector. The flanges 120-123 are provided with notches or openings 131 (FIGS. 4 and 5) to permit water to flow downwardly along the inclined bottom wall 118 into the water basin.

FIG. 12 illustrates a beam cap 132 which is adapted to be secured to the bottom edge of the beam 23 in substantially the same way as the connector 123 is attached to the beam as illustrated in FIG. 13. The beam cap includes a horizontal wall 133 and a pair of flanges 134 which are provided with ribs 135. The ribs 135 can be snap-fitted into the grooves 130 of the beam 23. The horizontal wall 133 can provide additional bearing surface for fill material 26.

All of the components which are used to construct the side walls of the cooling tower are preferably formed from pultruded fiberglass reinforced polyester resin. These components include the columns 22, the beams 23, the side panels 24, the gusset plates 77, the bottom channels 85, the panel filler members 103, 106, and 107, the top channel 110, and the drip collector 117. The pultruded components are significantly less expensive than fiberglass reinforced polyester resin parts which are made by the traditional method of laying up fiberglass in a gel-coated mold and spraying with resin. The shape of the pultruded parts permits the parts to be interfitted in a way which eliminates many connections which were heretofore necessary in fiberglass cooling towers and significantly reduces the time required to erect the cooling tower. Also, because the side panels 24 can be stacked on top of each other to form a wall of a desired height and can be stacked side by side to form a wall of a desired length merely by adding columns, the size of an individual side panel 24 is relatively small, thereby facilitating shipping and reducing shipping costs.

The cooling tower described herein combines the advantages of precast concrete towers, namely, durability, water resistance, fire resistance, etc., and the advantages of wood cooling towers, namely, versatility, lightweight, economical, etc. The cooling tower provides the benefits of both concrete and wood towers without the disadvantages.

The unique shape of the columns 22 permit the size of the cooling tower to be increased without difficulty in order to increase the cooling capacity of the tower. The width and/or length of the cooling tower can be increased simply by adding additional columns in either direction. As additional exterior columns are added, interior columns would also be used to support beams 23 inside of the tower for supporting the fill material.

The beams 23 extend between the columns 22 intermediate the top and bottom ends of the columns. The openings between the columns below the beams 23 are air inlet openings through which cooling air is drawn by the fan assembly 35. The wall thickness of the beams can be varied as desired depending upon the weight of the fill material 26 which is supported by the beams. Most of the weight of the fan assembly 35 is supported directly by the vertical water supply pipe 31. Accordingly, the columns, beams, and side panels are required to support only their own weight plus the weight of the cover 25 and wind loads and seismic loads.

FIG. 16 illustrates one method of supporting the vertically extending water supply pipe 31. The pipe extends downwardly through the bottom wall of the water basin 21 into a hole 136 in a concrete support pad 137. Thereafter, the hole 136 is filled with grout 138 or other fill material. If desired, the basin could be formed from concrete rather than having a separate concrete support pad. Alternatively, the liquid supply pipe 32 could be attached to a metal I beam below the water basin 21.

While in the foregoing specification a detailed description of a specific embodiment of the invention was set forth for the purpose of illustration, it will be understood that many of the details herein given may be varied considerably by those skilled in the art without departing from the spirit and scope of the invention.

I claim:

1. A cooling tower comprising at least four vertically extending columns, four of the columns providing four corners of the cooling tower, each of the columns having a generally cruciform cross section provided by a core section and four orthogonally related flange portions, each flange portion being formed by a pair of spaced-apart parallel flanges, at least four horizontally extending beams, each beam extending between a pair of adjacent columns and having each of its ends inserted between the parallel flanges of a column, means connecting the ends of each beam to the flanges of the associated column, at least four side panels, each of the side panels extending between a pair of adjacent columns and being supported by one of the beams, and a cover supported by the columns.

2. The structure of claim 1 in which the core section of each of the columns is formed by two pairs of parallel walls, each pair of walls extending perpendicularly to the other pair of walls, each pair of flanges being aligned with one of the pairs of walls.

3. The structure of claim 1 in which each of the columns is formed from pultruded fiberglass reinforced resin.

4. The structure of claim 1 in which each of the columns and each of the beams is formed from pultruded fiberglass reinforced resin.

5. The structure of claim 1 in which each of the columns and each of the beams and each of the side panels is formed from pultruded fiberglass reinforced resin.

6. The structure of claim 1 in which each of the side panels includes a pair of vertical side edges, each of the side edges being inserted between the parallel flanges of a column.

7. The structure of claim 1 including a basin at the bottom of the columns.

8. The structure of claim 1 including a metal beam below each of the columns for supporting the column, and a pin attached to the beam and extending upwardly into the core section of each of the columns for securing the column against horizontal movement.

9. The structure of claim 1 in which each of the pins has a rectangular cross section and fits relatively snugly within the core section of the column.

10. The structure of claim 1 including porous means for heat/mass exchange which is supported by the beams.

11. The structure of claim 1 including a drip collector positioned below each of the beams and attached thereto, each drip collector including a bottom wall which extends angularly downwardly toward the interior of the cooling tower whereby water which drips from the beams will flow into the cooling tower.

12. The structure of claim 1 in which each of the beams is generally rectangular in vertical cross section and includes a pair of vertically extending side walls and top and bottom walls which extend horizontally between the side walls.

13. The structure of claim 12 including a pair of gusset plates connected to each beam end and to the associated column, each of the gusset plates being connected to one of the side walls of a beam and to one of the flanges of a column.

14. The structure of claim 1 in which each of the side panels includes a pair of parallel spaced-apart vertical walls, horizontal top and bottom walls which extend between the vertical walls, and at least one reinforcing rib which extends between the vertical walls.

15. The structure of claim 14 in which the width of each side panel is less than the distance between the parallel flanges of the columns, and a filler member is inserted between each side panel and one of the flanges of the associated column.

16. The structure of claim 14 in which each of the side panels includes a top channel on the top wall thereof and an insert portion along the bottom thereof which can be inserted into the top channel of another side panel, each side of the cooling tower including a pair of upper and lower side panels, the insert portion of the upper side panel being inserted into the top channel of the lower side panel.

17. The structure of claim 1 in which the cooling tower includes at least eight of said columns, at least eight of said beams, and at least eight of said side panels, four of the columns providing four corners of the cooling tower and four other columns being positioned between each pair of adjacent corners to provide an intermediate column, each of the beams and each of the side panels extending between one of the corner columns and one of the intermediate columns.

18. The structure of claim 17 including four top channels which extend between the four corner columns and which are inserted over the tops of the side panels, said cover being supported by the top channels.

19. The structure of claim 1 including four top channels which extend between the columns and which are inserted over the tops of the side panels, said cover being supported by the top channels.

20. The structure of claim 1 including a basin at the bottom of the columns, porous means for heat/mass exchange which is supported by the beams, a liquid supply pipe extending vertically upwardly through the heat/mass exchange means, and liquid distribution means above the heat/mass exchange means and connected to the liquid supply pipe for distributing liquid to the top of the heat/mass exchange means.

21. The structure of claim 30 in which the liquid supply pipe is supported by a concrete pad below the basin.

* * * * *

UNITED STATES PATENT AND TRADEMARK OFFICE
CERTIFICATE OF CORRECTION

PATENT NO. :   5,028,357
DATED      :   July 2, 1991
INVENTOR(S) :  Charles J. Bardo It is certified that error appears in the above-identified patent and that said Letters Patent is hereby corrected as shown below:

Col. 8, line 23 change "1" to --8--.

Col. 10, line 9 change "30" to --20--.

Signed and Sealed this

Twenty-fourth Day of November, 1992

Attest:

DOUGLAS B. COMER

*Attesting Officer*   Acting Commissioner of Patents and Trademarks